April 22, 1952

A. A. MUEHLING 2,594,057

UNIVERSAL CHUCK VICE

Filed June 30, 1950

INVENTOR.
Anthony A Muehling
BY Myron J. Dikeman
ATTORNEY

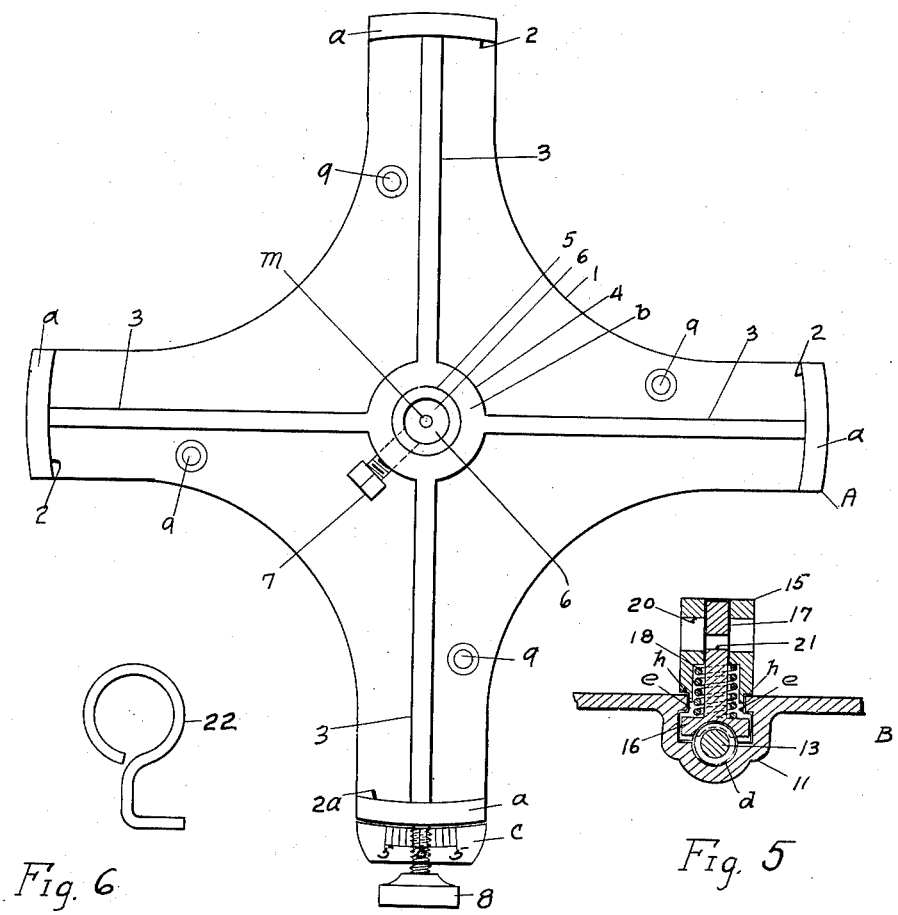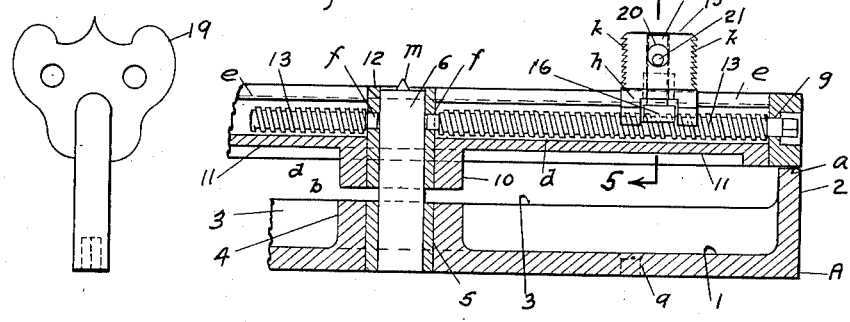

Patented Apr. 22, 1952

2,594,057

UNITED STATES PATENT OFFICE 2,594,057

UNIVERSAL CHUCK VICE

Anthony A. Muehling, Detroit, Mich.

Application June 30, 1950, Serial No. 171,463

2 Claims. (Cl. 279—112)

My invention relates to an adjustable vice for mounting on a horizontal work bench surface.

The object of my invention is to provide a universal vice especially adaptable to model or pattern construction work, designed for holding and rotating the work to any desired angle or position, and without removing the work from the clamping units.

Another object is to provide a universal vice for bench work, provided with several adjustable holding chuck blocks, each operative independently from the others, designed for rigidly clamping any design work unit, internal or external, therein.

A further object is to provide a universal chuck vice that can be rotated to any desired degree about its vertical support pivot, providing means for accurately spacing points or sections on the inclosed work.

A still further object is to provide a universal chuck vice for both bench work, and machine work, having a removable chuck face plate transferable to a lathe spindle for completing turned sections required on the work unit, and without removal from the vice.

These several objects are attained in the preferred form by the construction and arrangement of parts more fully hereinafter set forth.

Similar parts on all drawings are marked by similar numerals or letters.

Fig. 3 is a top view of the support base, with the circular chuck plate removed, showing the circumferential support shoulders, and means for rigidly mounting the frame on a bench horizontal surface.

Fig. 4 is a vertical sectional view taken on the line 4—4 of the Fig. 1, showing the detail construction of the adjustable chuck blocks, and means for adjusting said block positions.

Fig. 5 is a cross-sectional view taken on the line 5—5 of the Fig. 4, showing the chuck block adjusting mechanism.

Figs. 6 and 7 are illustrative operating keys for adjusting the chuck blocks to various positions on the face plate, and rigidly clamping the work units to be retained therein.

Figure 1:
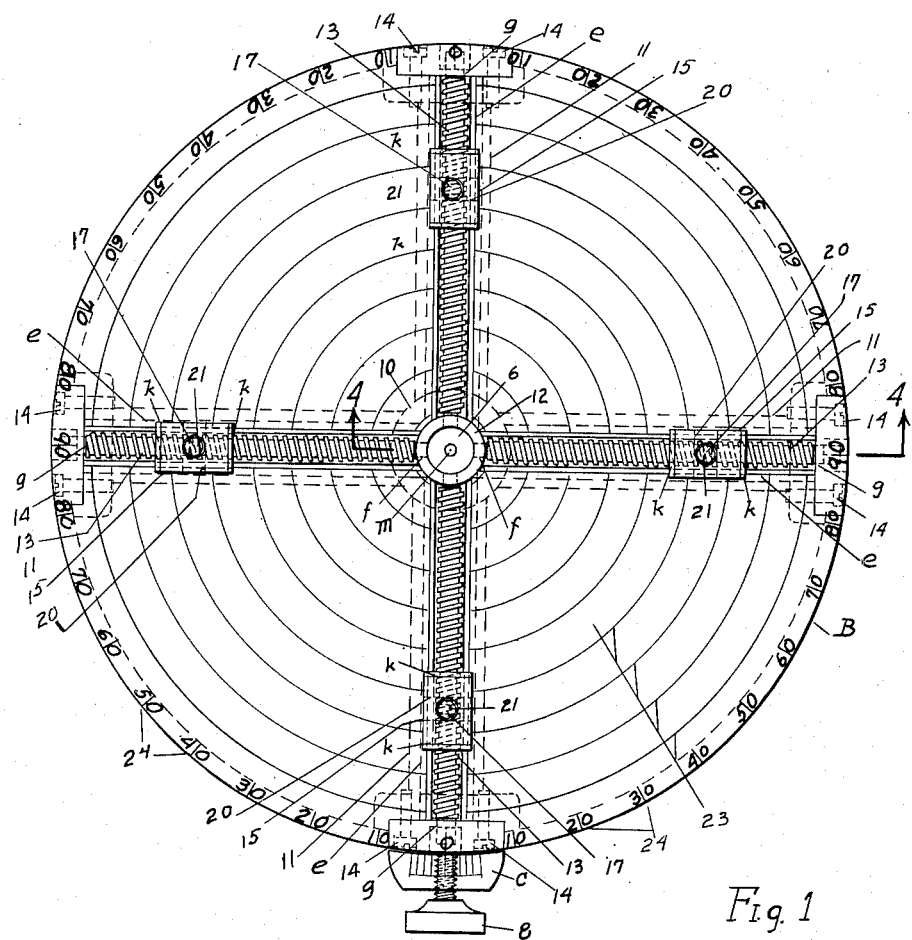
Fig. 1 is a plan view of the assembled vice showing the general arrangement of the surface chuck blocks and operating means.
Figure 2:
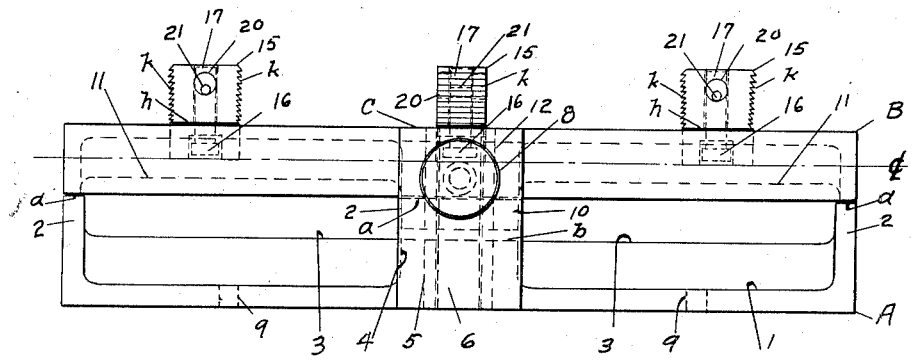
Fig. 2 is a side elevation of the assembled chuck vice showing the relative position of the support base and the circular chuck face plate rotatably mounted thereon.

I will now describe more fully the detailed construction of my device, referring to the drawings and the marks thereon.

In general, my invention comprises a fixed base section A, having a circular chuck block plate B pivotally mounted thereon, rotatable, horizontally, to any desired angle about the supporting pivot, and means for retaining the chuck block plate in a rigid locked position.

The base A is preferably formed with a horizontal forked web plate 1, designed with vertical end lugs 2 and 2a, provided with a central support hub 4 and intervening stiffener webs 3, all preferably cast of suitable metal. The outer surfaces $a$ of the end lugs 2 and 2a are accurately turned to a true parallel plane with the web plate 1 and concentric therewith. The central support hub 4 inner face $b$ is likewise turned parallel with the base web surface, and is provided with a central bearing 5 fixedly mounted therein, positioned at right angles thereto. Within the central bearing 5 is mounted an extended operating pivot shaft 6, rigidly retained therein by the set screw, 7, or other suitable means. One base web lug 2a is extended outside the lug outer face and projected to the chuck block plate upper surface, and formed with a vernier gauge $c$ operative with the circular chuck plate circumference. A disc lock screw 8 is threadably mounted through the lug end extension 2a, engageable with the chuck block plate edge, for retaining same in chosen locked positions. The web plate 1 is provided with suitable screw holes 9 for fixedly attaching the base A to a suitable work bench, or horizontal support surface.

Rotatably mounted on the operating base pivot 6 is the circular chuck block plate B, formed with a central hub 10 and radial grooved ribs 11, positioned at right angles to each other and with the respective groove openings along the upper plate surface. The circular chuck plate B is accurately turned on its outer surfaces to fit and engage the turned ends $a$ of the respective base lugs 2 and 2a, and is likewise provided with a central bearing thimble 12 fixedly mounted therethrough at right angles to the outer grooved surface, designed to fit over, and rotate on, the base operating pivot shaft 6. The grooved ribs 11 are formed with a semi-circular base recess $d$ and with milled, parallel, flanged slide ribs $e$ the entire length thereof, designed to receive threaded adjusting screws 13 rotatably mounted within the semi-circular recesses $d$, by special end bearings $f$ and $g$. The outer end block bearing $g$ is demountably attached within the plate edge recess by retaining screws 14. The adjusting screws 13 may be operated manually by a special hand wrench 19, or other suitable means, at will. Slidably mounted within the milled groove slides e are adjustable rectangular, chuck blocks 15, designed with side slide grooves $h$ for engaging and fitting the plate slides $e$, and move thereon. Each chuck block 15 is provided with an adjustable thread block 16 mounted on the end of an operating pin 17, and retained in its engaged position with the threaded adjusting screws 13, by an internal compression coil spring 18, as is shown in the Fig. 5 of the drawings. The chuck blocks 15 are formed with serrated edges $k$, on opposite edges thereof, providing both internal and external holding surfaces for various types of work to be mounted therein, and are provided with cross-recesses 20. The operating pins 17 are likewise provided with cross-operating recesses 21 positioned eccentrically with the respective block recesses 20, for receiving the operating key 22, shown in the Fig. 6 of the drawings, therein, designed for manually lifting the thread block 16 from the adjusting screw 13, for displacing the chuck blocks 15 to desired positions against work units mounted therein. The blocks 15 may be further adjusted, or tightened against the work unit by the operating key 19, as provided.

For more effectively mounting work units on the plate B concentric gauge rings 23 are formed on the plate surface at some predetermined spacing, and together with circumferential degree graduation marks 24, are provided, designed for accurately rotating the chuck block plate B to any desired angle with the adjacent vernier block $c$, and the zero point indicated thereon. For special work units, the operating pivot shaft 6 may be provided with a center point $m$ to more accurately locate the work concentric with the chuck block surface, when desired, and if required, the entire chuck block plate B and the attached work unit, may be released by the lock screw 8, and the block B remounted on a special lathe spindle, for turning circular sections thereon. In special cases, the circular chuck block plate B may be applied to a lathe spindle in the ordinary manner, and converted into a regular lathe chuck.

Having fully described my universal chuck vice, what I claim as my invention and desire to secure by Letters Patent, is:

1. A universal chuck vice adapted for shop bench work modeling, comprising a rigid mountable, horizontal base section formed with circular rim sections at opposite edges thereof and provided with a central pivot bearing, a circular chuck block plate formed with radially positioned grooves within the upper surface, rotatably mounted on the base section pivot bearing, adjustable chuck blocks slidably mounted within the chuck block plate grooves, chuck block adjusting means mounted within said plate grooves and operatively connected to said chuck blocks, designed for moving same in opposite directions to desired positions, and suitable locking means for rigidly retaining the said chuck block plate in various rotated positions.

2. A universal chuck vice adapted for bench modeling work, comprising a rigid, mountable, horizontal base section formed with true outer rim supports arranged in circular formation, a central pivot fixedly mounted within the base concentric with the circular rim supports and positioned at right angles thereto, a circular chuck block plate formed with radially positioned surface grooves and central bearing, rotatably mounted on the base central pivot, adjusting screws rotatably mounted within the base of said radially positioned surface grooves, means for operating said adjusting screws, movable chuck blocks slidably mounted within said surface grooves engageable with the respective adjusting screws, spring means for releasing the chuck blocks from the adjusting screws for manual displacement thereof, means for rigidly clamping said circular chuck block plate in any chosen rotated position.

ANTHONY A. MUEHLING.

REFERENCES CITED

The following references are of record in the file of this patent:

UNITED STATES PATENTS

| Number | Name | Date |
| --- | --- | --- |
| 785,564 | Mowat | Mar. 21, 1905 |
| 855,456 | Hillenbrand | June 4, 1907 |
| 1,315,467 | Church | Sept. 9, 1919 |
| 1,325,915 | Smart | Dec. 23, 1919 |

FOREIGN PATENTS

| Number | Country | Date |
| --- | --- | --- |
| 243,711 | Germany | June 8, 1911 |